United States Patent
Hara et al.

(10) Patent No.: US 8,940,064 B2
(45) Date of Patent: Jan. 27, 2015

(54) DUST COLLECTOR

(71) Applicants: Ryosuke Hara, Anjo (JP); Takayuki Tahara, Anjo (JP)

(72) Inventors: Ryosuke Hara, Anjo (JP); Takayuki Tahara, Anjo (JP)

(73) Assignee: Makita Corporation, Anjo-shi (JP)

(*) Notice: Subject to any disclaimer, the term of this patent is extended or adjusted under 35 U.S.C. 154(b) by 100 days.

(21) Appl. No.: 13/677,886

(22) Filed: Nov. 15, 2012

(65) Prior Publication Data
US 2013/0152519 A1 Jun. 20, 2013

(30) Foreign Application Priority Data
Dec. 20, 2011 (JP) .................................. 2011-278506

(51) Int. Cl.
*B01D 41/00* (2006.01)
*B01D 46/00* (2006.01)
*A47L 5/28* (2006.01)
*A47L 9/20* (2006.01)

(52) U.S. Cl.
CPC ............... *B01D 46/0068* (2013.01); *A47L 5/28* (2013.01); *A47L 9/20* (2013.01)
USPC .................... 55/303; 55/300; 55/301; 55/302

(58) Field of Classification Search
CPC ...... B01D 46/075; B01D 46/04; B01D 46/00; A47L 9/20
USPC .................................................... 55/300–303
See application file for complete search history.

(56) References Cited

U.S. PATENT DOCUMENTS

| | | | | |
|---|---|---|---|---|
| 4,204,849 A | * | 5/1980 | Johnston | ....................... 55/310 |
| 6,301,285 B1 | * | 10/2001 | Sieradzki et al. | ................. 373/9 |
| 7,082,640 B2 | * | 8/2006 | McCutchen | .................... 15/352 |

FOREIGN PATENT DOCUMENTS

JP B2-3457929 10/2003

* cited by examiner

*Primary Examiner* — Robert Clemente
*Assistant Examiner* — Karla Hawkins
(74) *Attorney, Agent, or Firm* — Oliff PLC (57) ABSTRACT

A dust collector having a filter for catching dust in air flowing in an intake path is provided. A pair of the intake paths are formed so as to be combined together on an upstream side of an electric blower provided in a main body. A pair of communication paths allow a discharge passage to communicate with each of the intake paths. A first opening and closing member is provided so as to open and close the intake path, and in a normal state, is biased to open the intake path. A second opening and closing member is provided so as to open and close the communication path, and in the normal state, is biased to close the communication path, and opens the communication path in response to a closing operation of the intake path by the first opening and closing member.

13 Claims, 12 Drawing Sheets

FIG. 12

DUST COLLECTOR

BACKGROUND OF THE INVENTION

This application claims the benefit of Japanese Patent Application Number 2011-278506 filed on Dec. 20, 2011, the entirety of which is incorporated by reference.

TECHNICAL FIELD

The present invention relates to dust collectors that include, in an upper part of a tank having a suction port, a main body having an electric blower, and that draw air through the suction port from outside by the electric blower, and catch dust in the air by a filter provided in the tank.

BACKGROUND ART

For example, Japanese Patent No. 3,457,929 discloses a dust collector in which a filter group separating a gas inlet of a dust container from a gas outlet thereof is contained in the dust container having a hermetically sealed structure, air and dust are drawn through the gas inlet into the dust container having a negative pressure due to evacuation from the gas outlet, and the dust is captured by the filter group. This dust collector is provided with a plurality of air inlet pipes each having at its one end an air inlet port provided so as to protrude from the dust container and to open, and having at the other end an air discharge port. The air, which has been drawn in the dust collector through the air inlet port by opening the output air inlet port by an electromagnetic valve, is blown from an air discharge port onto the filter group to remove the dust adhering to the filter group.

For example, in the case where two air inlet pipes are provided in this dust collector, an electromagnetic valve of one of the air inlet pipes is opened, and an electromagnetic valve of the other air inlet pipe is closed during operation of the dust collector. Thus, the dust adhering to a part of the filter group is removed by using the one air inlet pipe, whereby the part of the filter group can be cleaned while capturing dust by another part of the filter group.

However, since the above dust collector uses the electromagnetic valves to open and close the air inlet pipes, a device that electrically controls electromagnets that drive the electromagnetic valves is required, which may complicate the structure of the dust collector.

SUMMARY OF THE INVENTION

It is an object of the present invention to provide a dust collector capable of cleaning a filter during operation with a simple structure.

According to a first aspect of the present invention, a dust collector includes a tank having a suction port in its upper part, and a main body including an electric blower. Air drawn through the suction port from outside by an electric blower is discharged through the tank and the main body. The dust collector further includes a filter that separates the suction port from the main body in an intake path extending from the suction port to the electric blower and that is capable of catching dust in the air is provided in the tank. The dust collector further includes a pair of the intake paths in which air flows respectively through a pair of the filters projecting within the tank, and formed so as to be combined together on an upstream side of the electric blower, a pair of communication paths that allow a discharge passage on a downstream side of the electric blower to communicate with each of the intake paths, first opening and closing members each provided on a downstream side of the communication path in the intake path, capable of opening and closing the intake path, and formed so as to be biased, in a normal state, to a position where the first opening and closing member opens the intake path, second opening and closing members each provided in the communication path, capable of opening and closing the communication path, formed so as to be biased, in the normal state, to a position where the second opening and closing member closes the communication path, and to open the communication path in response to a closing operation of closing the intake path by the first opening and closing member, and an operation unit capable of alternately causing the first opening and closing members in the intake paths to perform the closing operation, wherein when the operation unit causes one of the first opening and closing members to perform the closing operation and thus causes the second opening and closing member to open the communication path, discharged air in the discharge passage is guided to one of the intake paths via the communication path, the discharged air is caused to flow backward in the intake path and returned to the tank through the filter, and is guided to the other intake path, so that the dust on the filter of the one intake path is removed.

According to a second aspect of the present invention, in the first aspect, the operation unit includes a motor placed between the pair of first opening and closing members, and a cam member provided on an output shaft of the motor and formed to alternately contact the first opening and closing members respectively in response to rotation of the output shaft so that the first opening and closing member performs the closing operation.

According to a third aspect of the present invention, in the second aspect, the filters through which air flows in the pair of intake paths are placed outside the motor so as to face each other with an interval therebetween, and each of the first opening and closing members is placed between each of the filter and the motor.

According to a fourth aspect of the present invention, in the first aspect, the filter includes a primary filter capable of catching the dust and having been subjected to an antistatic treatment.

According to a fifth aspect of the present invention, in the first aspect, a tilted portion having a vent hole is provided on the downstream side of the communication path in the intake path so as to face the first opening and closing member in the normal state with a space for air flow therebetween, and the first opening and closing member performing the closing operation is capable of contacting the tilted portion in a state where the vent hole is closed and the space for air flow is eliminated.

In the dust collector according to the first aspect of the present invention, the first opening and closing members of the pair of intake paths is alternately caused to perform the closing operation by the operation unit. Thus, dust can be alternately removed from the filters of the pair of intake paths. Accordingly, the filters in the pair of intake paths can be cleaned during the operation of the dust collector as well. Moreover, since the first opening and closing members and the second opening and closing members are operated by the operation unit, electric control is not required to operate the opening and closing members, whereby the structure of the dust collector is simplified.

In the dust collector according to the second aspect of the present invention, the number of motors and cam members that alternately cause the first opening and closing members to perform the closing operation can be minimized. This can suppress manufacturing cost of the dust collector.

In the dust collector according to the third aspect of the present invention, the filters through which air flows in the pair of intake paths can be arranged in the tank so as not to interfere with the motor and the first opening and closing members, so that longitudinal dimension of the tank can be suppressed.

In the dust collector according to the fourth aspect of the present invention, accumulation of static electricity on the primary filter can be suppressed. This suppresses electrostatic attraction of dust to the primary filter, whereby satisfactory dust separation from the filter can be achieved.

In the dust collector according to the fifth aspect of the present invention, in the normal state of the first opening and closing member, the vent hole of the tilted portion provided on the downstream side of the communication path in the intake path is opened. In addition, the space for air flow is retained sufficiently between each of the first opening and closing members in the normal state and the tilted portion. Accordingly, the intake paths can be opened in the normal state. On the other hand, if the first opening and closing member is caused to perform the closing operation, the vent hole is closed and the space for air flow is eliminated, whereby each intake path can be closed.

DETAILED DESCRIPTION OF THE EMBODIMENTS

Figure 1:
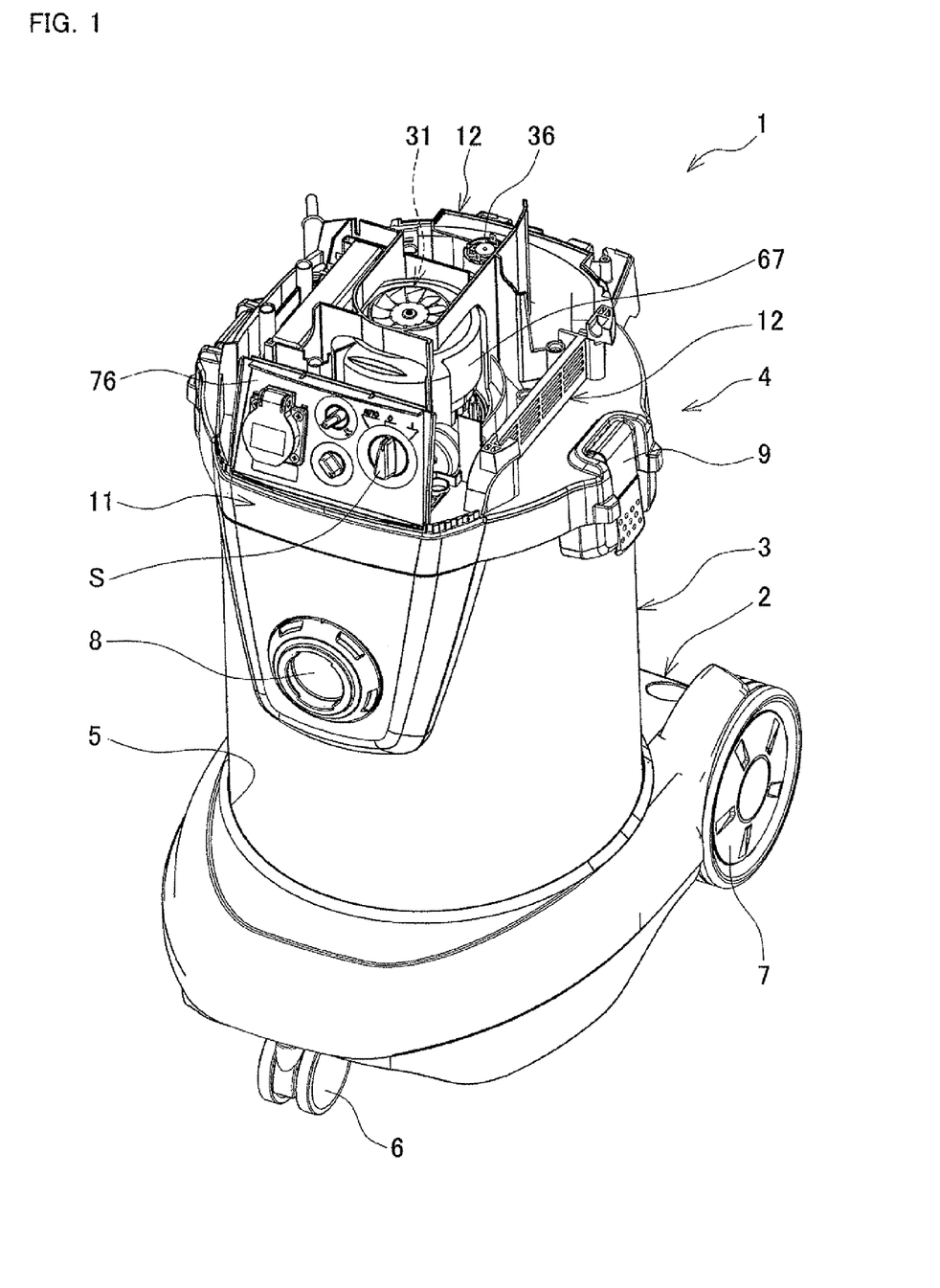
FIG. 1 is an overall perspective view of a dust collector according to an embodiment of the present invention.
Figure 2:
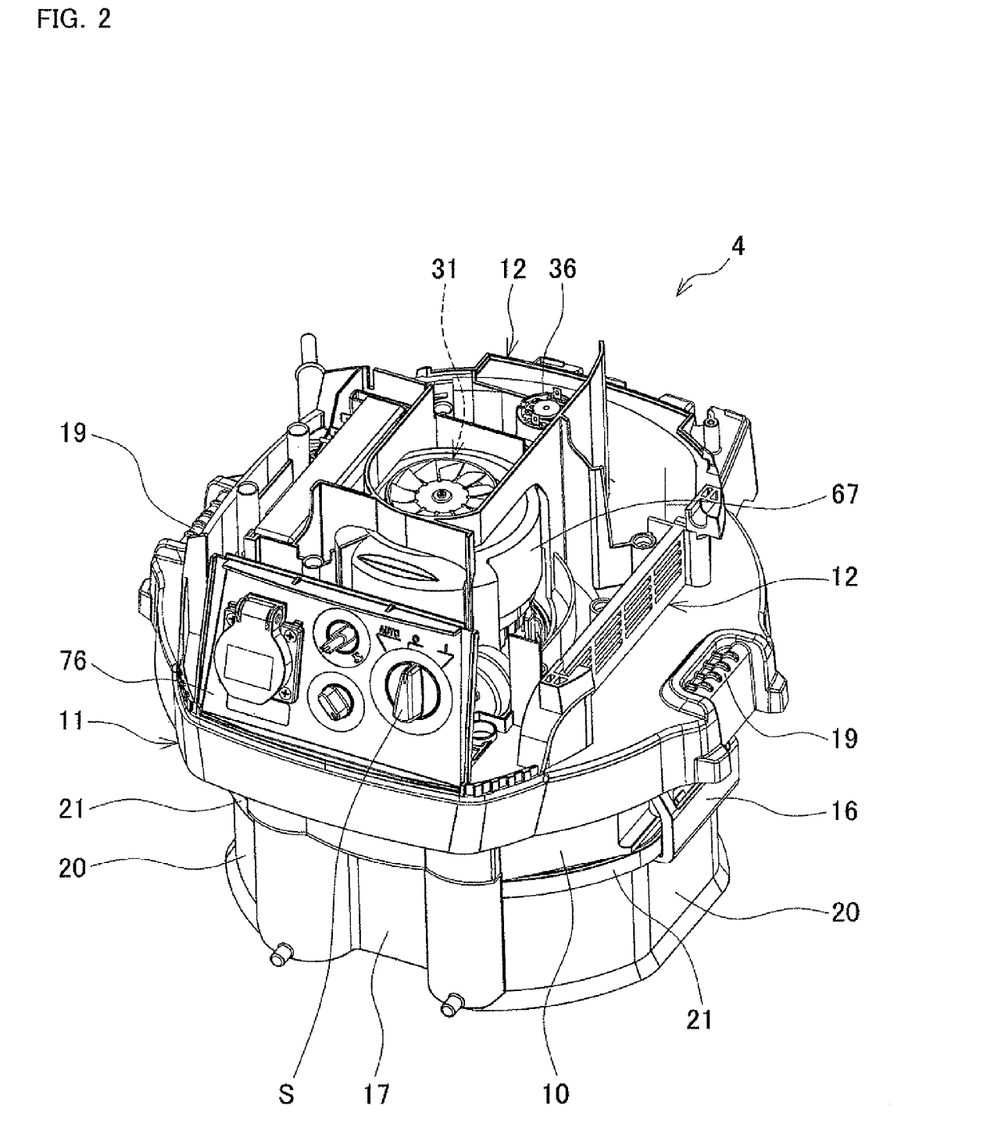
FIG. 2 is an overall perspective view of a main body included in the dust collector.
Figure 3:
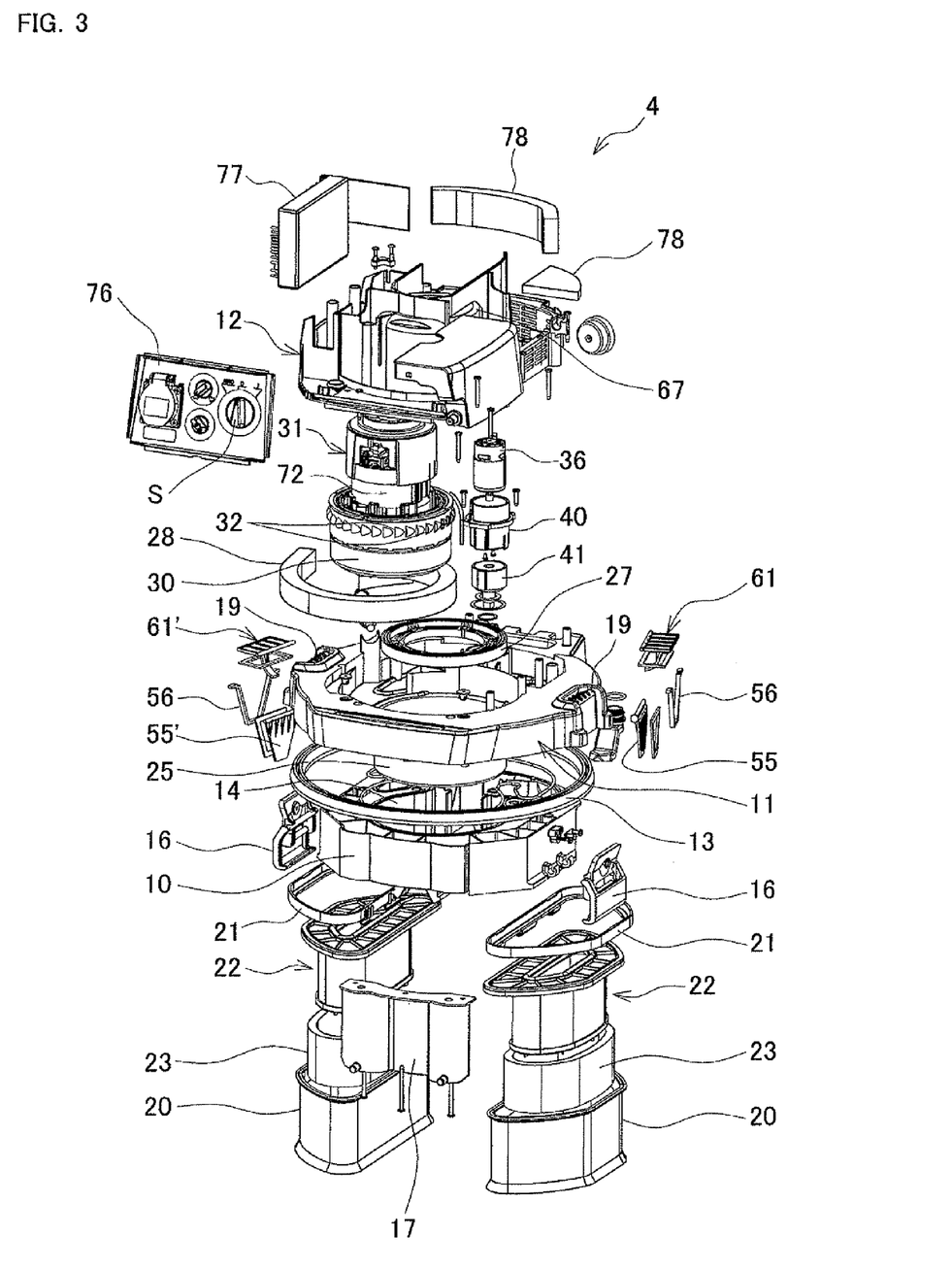
FIG. 3 is an exploded perspective view of a filter fixing member, a main body case, and a main body case cover which form the main body.

An embodiment of the present invention will be described with reference to FIGS. 1 to 11. As shown in FIGS. 1 to 3, a dust collector 1 includes a traveling base 2, a tank 3, and a main body 4. The traveling base 2 is molded by using a synthetic resin, and has a circular recess 5 (see FIG. 1) in the upper surface thereof. One front wheel 6 is rotatably provided on a front (the side closer to the viewer in FIG. 1) central part of the bottom surface of the traveling base 2, and a pair of rear wheels 7, 7 are rotatably provided on the rear (the side away from the viewer in FIG. 1) left and right parts of the traveling base 2. The dust collector 1 is capable of traveling by the front wheel 6 and the rear wheels 7, 7.

The tank 3 is made of stainless steel, and is formed to have a bottomed cylindrical shape opening in its upper part. The tank 3 is placed on the upper surface of the traveling base 2 so as to be fitted in the recess 5. A suction port 8 is formed in the front surface (the side closer to the viewer in FIG. 1) of the tank 3. A dust-collecting hose is connected to the suction port 8. Hooks 9, 9 are attached to the outer side surfaces of the tank 3. As shown in FIG. 1, the main body 4 can be fixed to the upper part of the tank 3 by engaging the ends of the hooks 9, 9 with hook engagement portions 19, 19 (see FIG. 2) of a main body case 11 described below.

Figure 9:
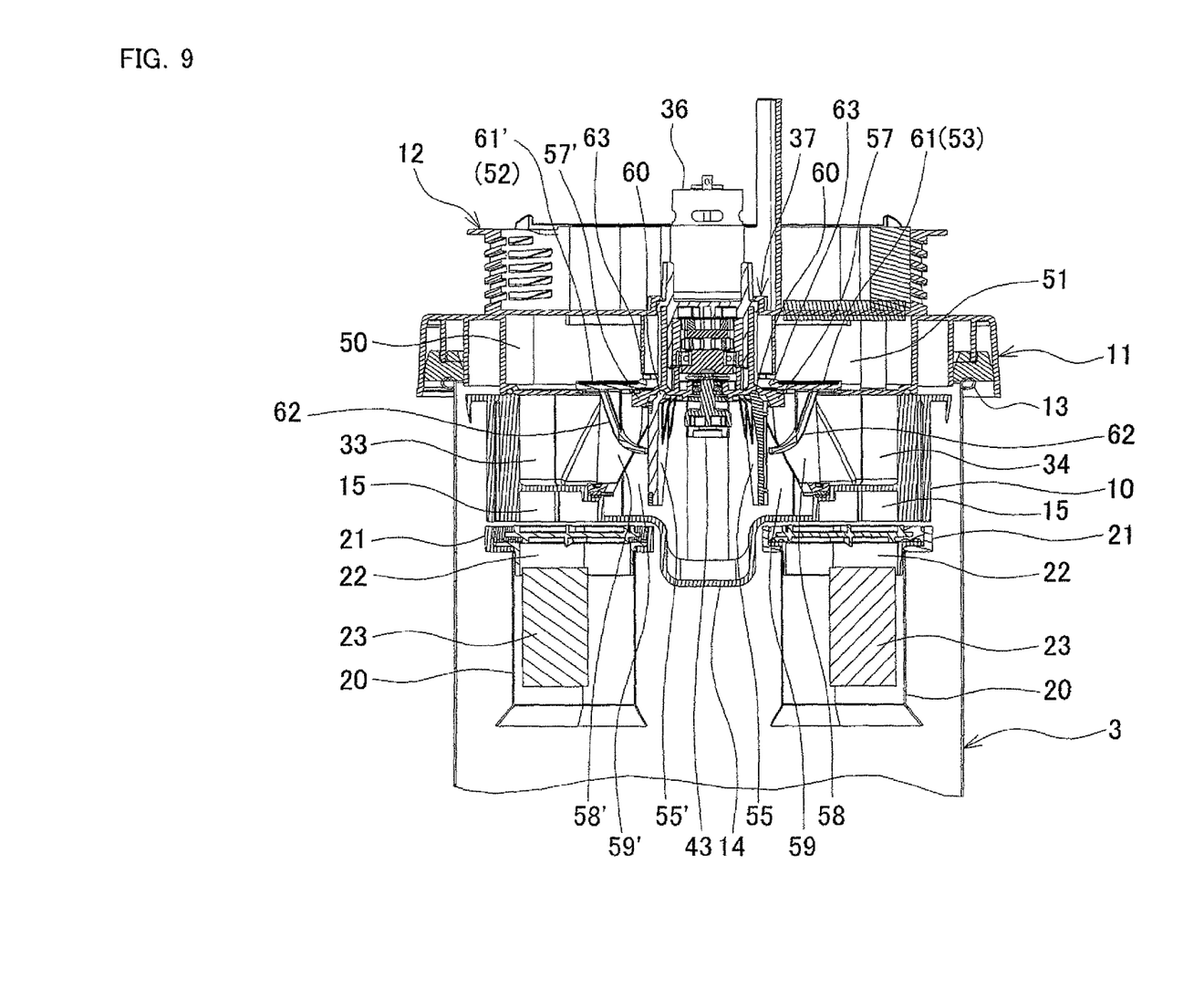
FIG. 9 is a diagram illustrating an operation of catching dust by a pair of filters provided in a tank.

As shown in FIG. 3, the main body 4 has a filter fixing member 10, the main body case 11, and a main body case cover 12. The filter fixing member 10 is screwed on the lower surface of the main body case 11. As shown in FIGS. 3 and 9, the filter fixing member 10 is provided with a hollow portion 14 that extends from the central part of the filter fixing member 10 to the rear part of the filter fixing member 10, that protrudes downward, and that is closed in the lower part thereof and open in the upper part thereof. The filter fixing member 10 is provided, on the right and left sides of the hollow portion 14, with long holes 15, 15 extending in the front-rear direction of the dust collector 1. Moreover, as shown in FIGS. 2 and 3, latch members 16, 16 each capable of swinging via a support shaft are attached to the left and right side surfaces of the filter fixing member 10. An electrode holding plate 17 is screwed on a front part of the lower surface of the filter fixing member 10 so as to project downward.

As shown in FIGS. 2, 3, and 9, prefilters 20, 20 serving as primary filters are attached to the lower surface of the filter fixing member 10 so as to communicate with the long holes 15, 15. Since the main body 4 is fixed to the upper part of the tank 3, the prefilters 20, 20 and the electrode holding plate 17 project within the tank 3 from the lower surface of the filter fixing member 10. A pair of water-level detection electrodes (not shown) are held on the back surface of the electrode holding plate 17 so as to be located at the same position in the vertical direction and with a predetermined interval therebetween in the lateral direction. In the present embodiment, a voltage is applied to the pair of water-level detection electrodes, and when the water-level detection electrodes are electrically connected together via water, it is detected that a certain amount of water has entered the tank 3. The operation of the dust collector 1 is stopped if it is detected that the certain amount of water has entered the tank 3. The prefilter 20 is a cylindrical body that is made of woven fabric, that has an elliptical shape as viewed in plan, and that is open in the upper part and closed in the lower part. The prefilter 20 thus can separate the suction port 8 from the main body 4 within the tank 3. A ring-shaped engagement member 21 (see FIGS. 2 and 3) is attached to the peripheral edge of the upper part of the prefilter 20. In the present embodiment, the left and right latch members 16, 16 are respectively engaged with the engagement members 21, 21 of the prefilters 20, 20, whereby the prefilters 20, 20 are fixed to the lower surface of the filter fixing member 10 in a close contact state. Each prefilter 20 has been subjected to a well-known antistatic treatment using an antistatic agent.

As shown in FIGS. 3 and 9, a paper filter 22 as a tertiary filter is mounted inside each prefilter 20 so as to communicate with the long hole 15. This filter 22 is a cylindrical body that has an elliptical shape as viewed in plan, and that is open in the upper part and closed in the lower part. The filter 22 is placed inside the prefilter 20 so that its filter surface faces an inner surface of the prefilter 20. A polyurethane sponge filter 23 serving as a secondary filter is mounted on the filter surface of the filter 22 in each prefilter 20. Since the main body 4 is fixed to the upper part of the tank 3, each filter 22, 23 can separate the suction port 8 from the main body 4 within each prefilter 20. The prefilter 20 and the filters 22, 23 are an example of the filter of the present invention.

Figure 4:
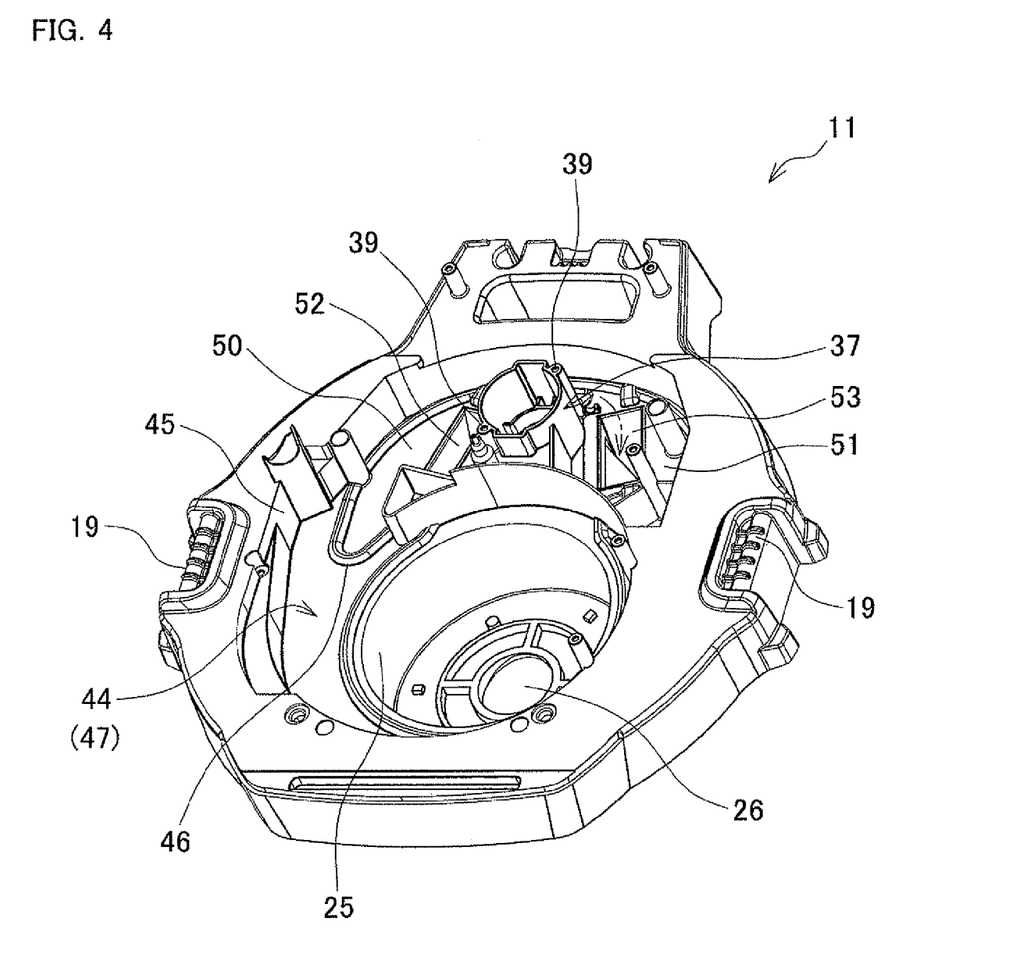
FIG. 4 is an overall perspective view of the main body case.
Figure 11:
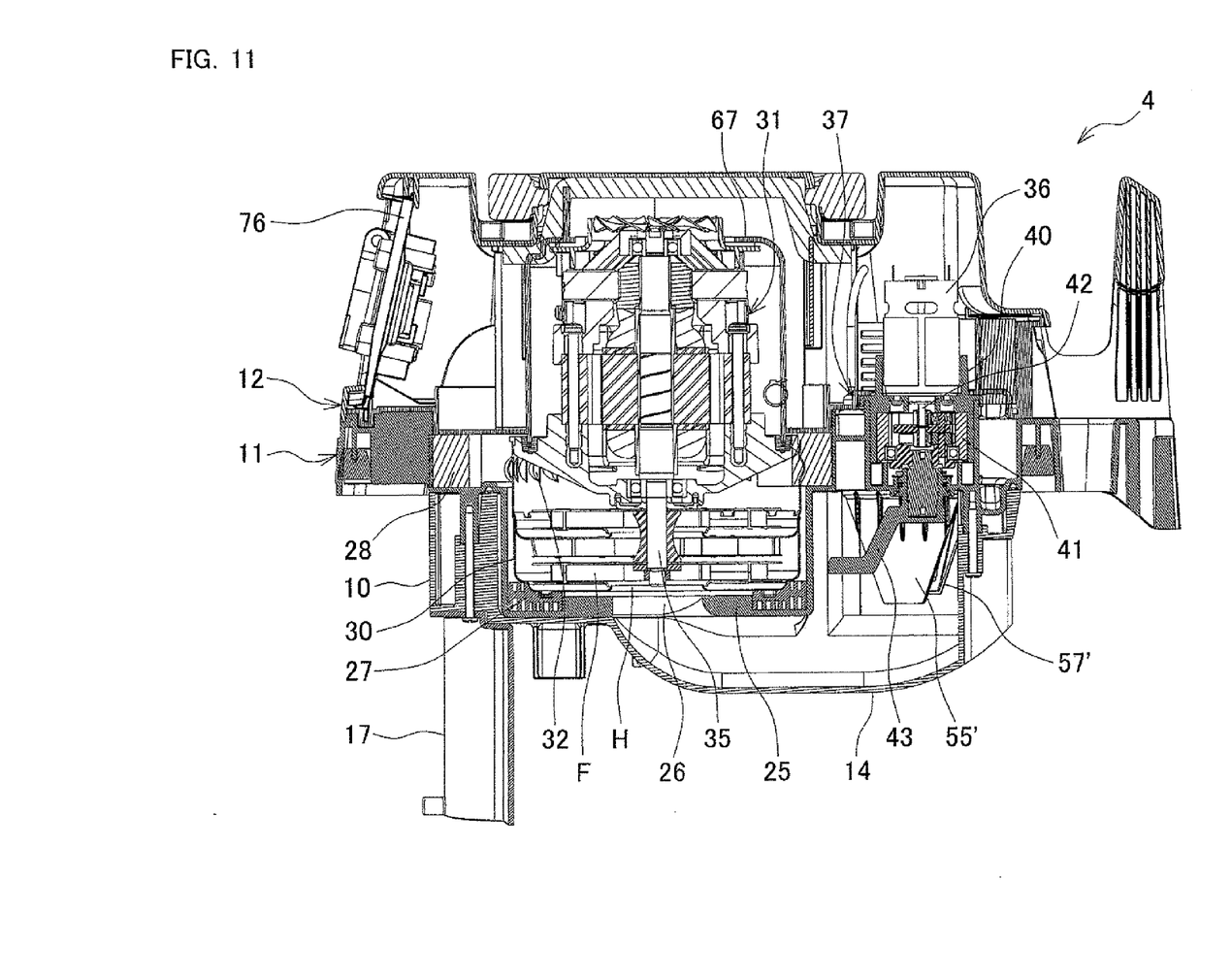
FIG. 11 is a sectional side view of a main part of the main body.

As shown in FIGS. 3 and 4, the main body case 11 includes a bottomed cylindrical portion 25 that is made of a synthetic resin and that is open in its upper part. The cylindrical portion 25 is provided, protruding downward, at a part of the main body case 11, which is located more toward the front side (the side closer to the viewer in FIGS. 3 and 4) with respect to the center of the main body case 11. An inlet port 26 (see FIG. 4) is formed in the central portion of the lower surface of the cylindrical portion 25. In the state where the filter fixing member 10 is fixed to the lower surface of the main body case 11, the cylindrical portion 25 can fit in the hollow portion 14 of the filter fixing member 10. An electric blower 31 (see FIGS. 3 and 11) is fitted in the cylindrical portion 25 in such an attitude that a fan cover 30 (see FIG. 3) covering a fan F (see FIG. 11) faces downward. The fan F is coupled to the tip end of a rotating shaft 35 (see FIG. 11) of a motor, and a plurality of air discharge portions 32 (see FIGS. 3 and 11) are provided on the outer peripheral surface of the upper part of the fan cover 30. The fan cover 30 excluding the upper part thereof is fitted in the cylindrical portion 25, so that the air discharge portions 32 can be placed outside the cylindrical portion 25. When the fan cover 30 is fitted in the cylindrical portion 25, a vent hole H (see FIG. 11) provided in the central portion of the lower surface of the fan cover 30 is placed so as to face the inlet port 26 of the cylindrical portion 25. Reference numeral 27 in FIGS. 3 and 11 represents a ring-shaped seal member that seals between the peripheral edge of the lower end of the fan cover 30 and the inlet port 26, and reference numeral 28 represents a sound-absorbing material.

As shown in FIG. 9, intake passages 33, 34 are formed in the filter fixing member 10. The intake passages 33, 34 extend in the front-rear direction of the dust collector 1 on the left and right sides of the cylindrical portion 25 fitted in the hollow portion 14, and extend to the rear side of the cylindrical portion 25 to communicate with the hollow portion 14. The intake passages 33, 34 communicate with the long holes 15.

Figure 6:
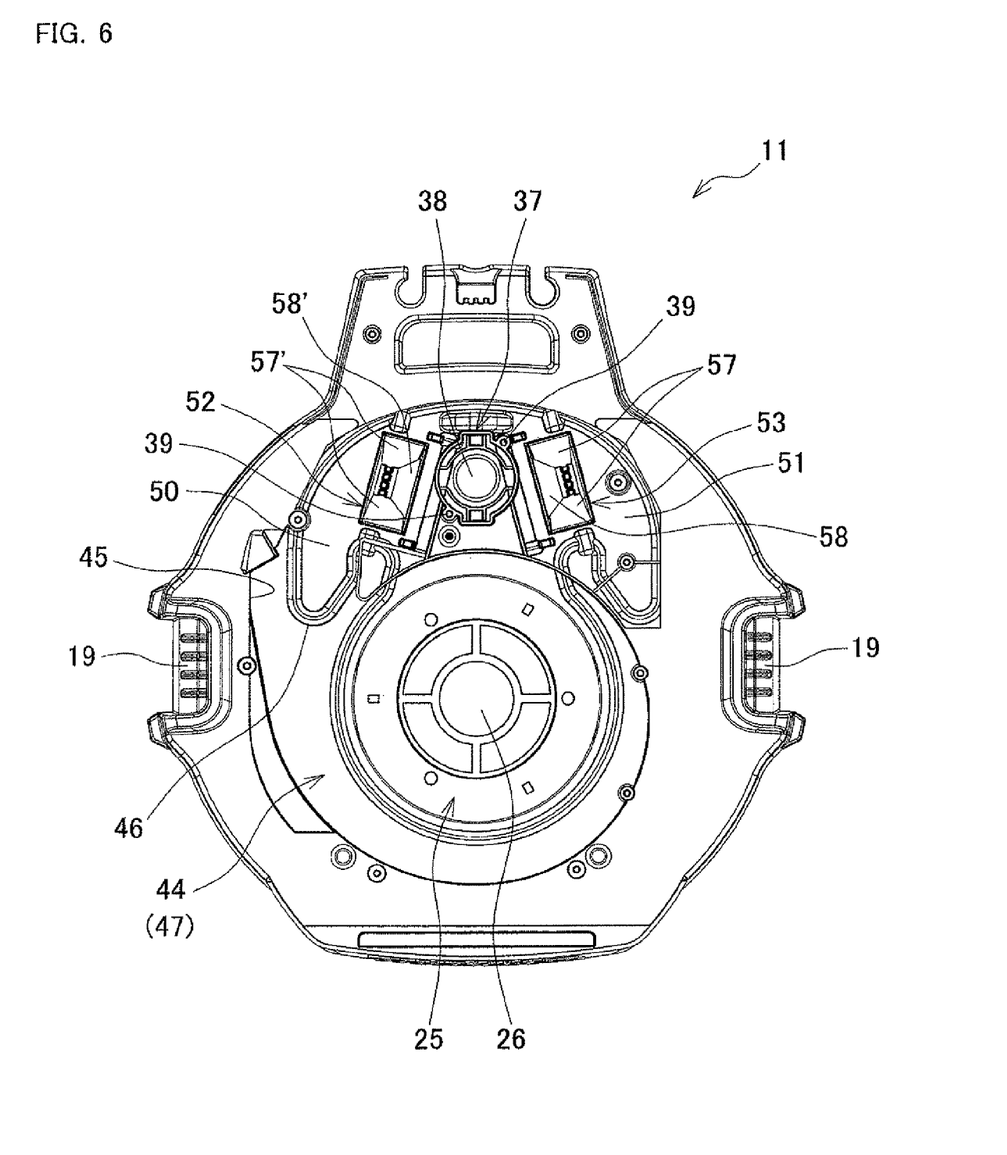
FIG. 6 is a plan view of the main body case.
Figure 7:
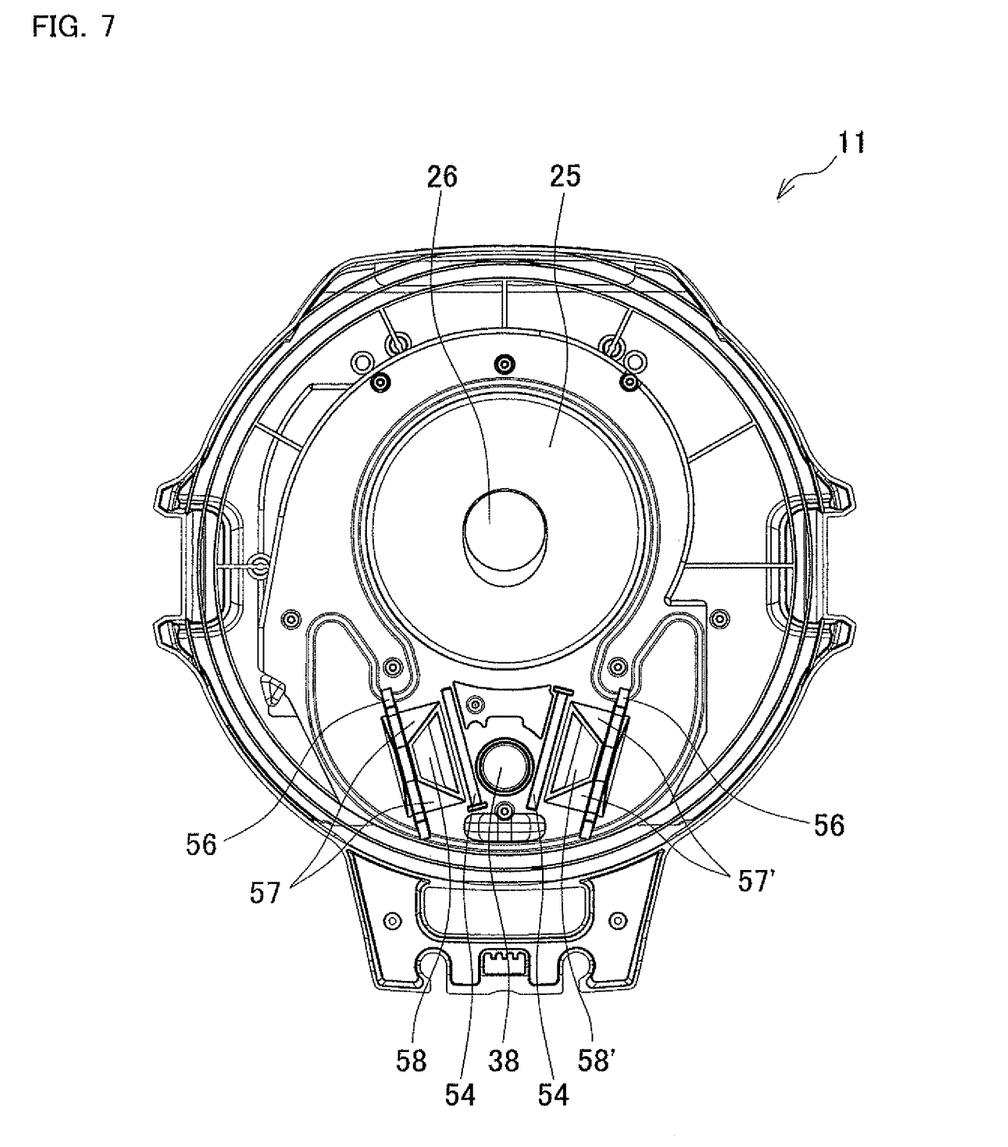
FIG. 7 is a back view of the main body case.

As shown in FIGS. 4, 6, and 9, a motor accommodating portion 37 is placed on the upper surface of the main body case 11. The motor accommodating portion 37 is provided behind the cylindrical portion 25 so as to stand on the upper surface of the main body case 11 and so as to surround a speed reducer cover 40 (see FIGS. 3 and 11) attached to a DC motor 36. As shown in FIGS. 6 and 7, a communication hole 38 that allows the motor accommodating portion 37 to communicate with the main body case 11 is formed in the upper surface of the main body case 11 which corresponds to the bottom surface of the motor accommodating portion 37. The DC motor 36 is fixed in the motor accommodating portion 37 by tightening screws in screw holes in the speed reducer cover 40 attached to the DC motor 36 and screw holes 39, 39 (see FIGS. 4 and 6) in the motor accommodating portion 37. A cam member 43 (see FIGS. 9 and 11) having substantially a reversed L-shape as viewed from the side is coupled to an output shaft 42 (see FIG. 11) of the DC motor 36 through the communication hole 38 via a speed reducer 41 (see FIGS. 3 and 11) accommodated in the speed reducer cover 40. In the present embodiment, the DC motor 36 is rotated alternately to the right and left, whereby the cam member 43 can be rotated alternately to the right and left.

As shown in FIGS. 4 and 6, a discharge passage 44 is provided in the upper surface of the main body case 11. The discharge passage 44 is formed by a space 47 that is surrounded by a wall surface 45 (see FIG. 4) and a rib 46 (see FIG. 4) and is continuous to the opening in the upper surface of the cylindrical portion 25. As described below, air discharged from the air discharge portions 32 (see FIG. 3) located on the downstream side of the electric blower 31 can be discharged from an outlet port 48 and outlet windows 49 (see FIG. 5) to the outside of the main body 4 through the discharge passage 44.

As shown in FIGS. 4, 6, and 9, communication paths 50, 51 that are continuous to the downstream side of the discharge passage 44 are formed on the left and right sides of the motor accommodating portion 37 in the upper surface of the main body case 11. As shown in FIGS. 4 and 6, the upper surface of the main body case 11 is provided with inlet ports 52, 53 on the downstream side of the communication paths 50, 51, respectively, which allow the communication paths 50, 51 to communicate with the intake passages 33, 34 (see FIG. 9). This allows the discharge passage 44 to communicate with the intake passage 33 via the communication path 50 and the inlet port 52, and also allows the discharge passage 44 to communicate with the intake passage 34 via the communication path 51 and the inlet port 53. The hook engagement portions 19, 19 are also provided on the upper surface of the main body case 11. As shown in FIGS. 3 and 9, a ring-shaped seal member 13 is attached to the lower surface of the main body case 11. This allows the main body case 11 to be fixed to the tank 3 in a close contact state.

As shown in FIGS. 6, 7, and 9, a tilted wall 57' is provided in a communication part of the intake passage 33, which is located on the downstream side of the inlet port 52 and which communicates with the hollow portion 14. The tilted wall 57' separates this communication part from the hollow portion 14, and has a vent hole 58'. The tilted wall 57' is formed integrally with a tilted wall formation member 56 (see FIGS. 3 and 7) that is attached to the communication part. A plate-like first opening and closing member 55' (see FIGS. 3 and 9) capable of opening and closing the vent hole 58 is rotatably supported near the tilted wall 57' on the lower surface of the main body case 11 via a support shaft 60 (see FIG. 9). Reference numeral 54 in FIG. 7 represents a fitting hole in which the support shaft 60 is rotatably fitted. In a normal state, as shown in FIG. 9, the first opening and closing member 55' is biased so as to extend in the vertical direction at a position where the first opening and closing member 55 opens the vent hole 58'. As shown in FIGS. 6, 7, and 9, the tilted wall 57' is tilted such that the upper part thereof is located more toward the first opening and closing member 55' than the lower part thereof in the normal state, and faces the first opening and closing member 55' in the normal state so that a space for air flow 59' (see FIG. 9) is interposed therebetween. The tilted wall 57' is an example of the tilted portion of the present invention.

Figure 8:
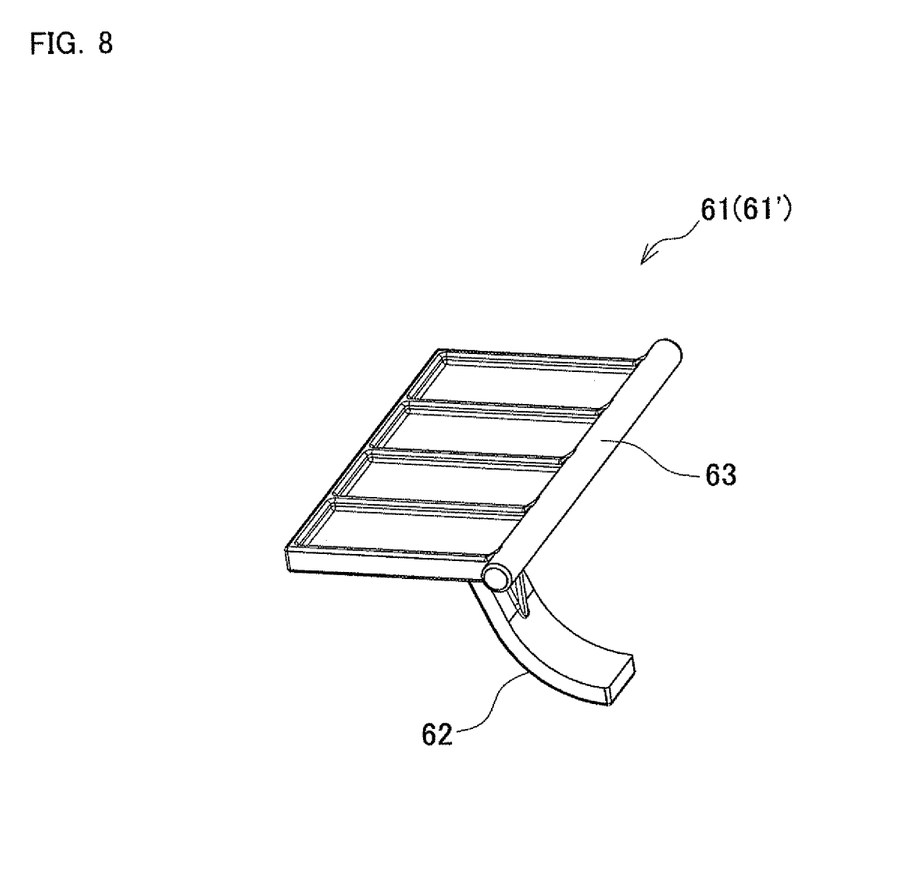
FIG. 8 is a perspective view of a second opening and closing member capable of opening and closing a communication path formed in the main body case.

As shown in FIGS. 8 and 9, a plate-like second opening and closing member 61'capable of opening and closing the inlet port 52 is provided in the inlet port 52 of the communication path 50. The second opening and closing member 61' includes a bar-shaped arm portion 62 extending in the vertical direction with its distal end facing the first opening and closing member 55'. The second opening and closing member 61' is supported in the communication path 50 so as to be rotatable about a support shaft 63 (see FIG. 9) supported by the bottom surface of the communication path 50. In a normal state, the second opening and closing member 61' is biased to a lateral attitude at a position where the second opening and closing member 61 closes the inlet port 52 by its own weight.

As in the communication part of the intake passage 33 which communicates with the hollow portion 14, a tilted wall 57 having a vent hole 58 is provided in a communication part of the intake passage 34, which is located on the downstream side of the inlet port 53 and which communicates with the hollow portion 14. A first opening and closing member 55 capable of opening and closing the vent hole 58 is provided near the tilted wall 57. As in the inlet port 52 of the communication path 50, a second opening and closing member 61 capable of opening and closing the inlet port 53 is provided in the inlet port 53 of the communication path 51 shown in FIGS. 6 and 9. The tilted wall 57 is also an example of the tilted portion of the present invention.

As a characteristic configuration of the present embodiment, in order to suppress an increase in longitudinal dimension of the dust collector 1, the pair of prefilters 20, 20 are placed outside the DC motor 36 in the tank 3 shown in FIG. 9 so as to face each other with an interval therebetween in the lateral direction. In addition, each of the first opening and closing members 55, 55' is placed between the prefilter 20 and the DC motor 36 in the lateral direction of the dust collector 1.

Figure 5:
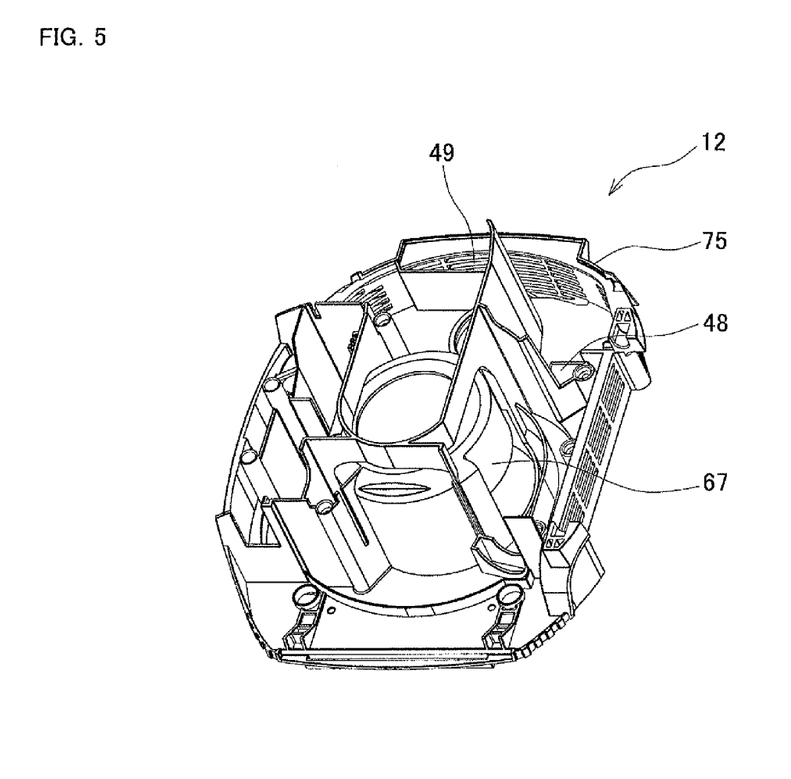
FIG. 5 is an overall perspective view of the main body case cover.

The main body case cover 12 shown in FIGS. 1 to 3, and 5 is made of a synthetic resin, and closes the opening in the upper surface of the main body case 11. The main body case cover 12 has a body cover accommodating portion 67 that is open in its upper part. The body cover accommodating portion 67 is provided, protruding upward, at a part of the main body case cover 12, which is located more toward the front side with respect to the center of the main body case cover 12. In the state where the main body case cover 12 is fixed to the upper part of the main body case 11 by tightening screws in the main body case cover 12 and the main body case 11, the body cover accommodating portion 67 vertically accommodates a body cover 72 (see FIG. 3) accommodating the motor of the electric blower 31, etc. As shown in FIG. 5, the outlet port 48 is formed in the upper surface of the main body case cover 12. The outlet port 48 allows the upper surface of the main body case cover 12 to communicate with the opening in the upper surface of the main body case 11. The plurality of outlet windows 49 are formed in a wall surface 75 located on the rear side of the main body case cover 12. An operation portion 76 is provided on the front surface of the main body case cover 12. Various switches such as an operation switch S and an outlet for power supply to external equipment are placed in the operation portion 76. In FIG. 3, reference numeral 77 represents a controller, and reference numeral 78 represents a sound-absorbing material. The controller 77 and the sound-absorbing material 78 are accommodated in the main body case cover 12.

Operation of the dust collector 1 will be described below. In response to turning-on of the operation switch S (see FIG. 1) provided in the main body 4 (see FIG. 1) of the dust collector 1, the motor of the electric blower 31 shown in FIG. 3 is driven to rotate the fan F (see FIG. 11) in the fan cover 30. Then, air containing dust is drawn into the tank 3 through the suction port 8 (see FIG. 1) from outside via the dust-collecting hose, and this air flows through the prefilters 20, 20, the filters 23, 23, and the filters 22, 22 shown in FIG. 9, and into the intake passages 33, 34 through the long holes 15. At this time, part of the dust is caught by the prefilters 20, 20, and the dust that has passed through the prefilters 20, 20 is sequentially caught by the filters 23, 23 and the filters 22, 22.

Then, the air that has flown into the intake passage 33 flows through the vent hole 58' of the tilted wall 57' and the space for air flow 59' into the hollow portion 14 of the filter fixing member 10. Then, the air flows through the vent hole H (see FIG. 11) of the fan cover 30 from the inlet port 26 (see FIG. 11) of the main body case 11, and is guided into the fan cover 30. Similarly, the air that has flown into the intake passage 34 flows through the vent hole 58 of the tilted wall 57 and the space for air flow 59 into the hollow portion 14 of the filter fixing member 10. Then, the air flows through the vent hole H (see FIG. 11) of the fan cover 30 from the inlet port 26 (see FIG. 11) of the main body case 11, and is guided into the fan cover 30. As described above, in the dust collector 1, the prefilters 20, 20, the filters 23, 23, and the filters 22, 22 are provided, the pair of intake paths are formed so as to extend from the suction port 8 to the vent hole H of the fan cover 30 on the upstream side of the electric blower 31, and the pair of intake paths are combined together near the vent hole H of the fan cover 30. The air guided into the fan cover 30 is discharged into the discharge passage 44 shown in FIG. 4 from the air discharge portions 32 (see FIGS. 3 and 11). Then, the air flows through the outlet port 48 (see FIG. 5) from the discharge passage 44, and is discharged to the outside of the main body 4 from the outlet windows 49 (see FIG. 5).

Figure 10:
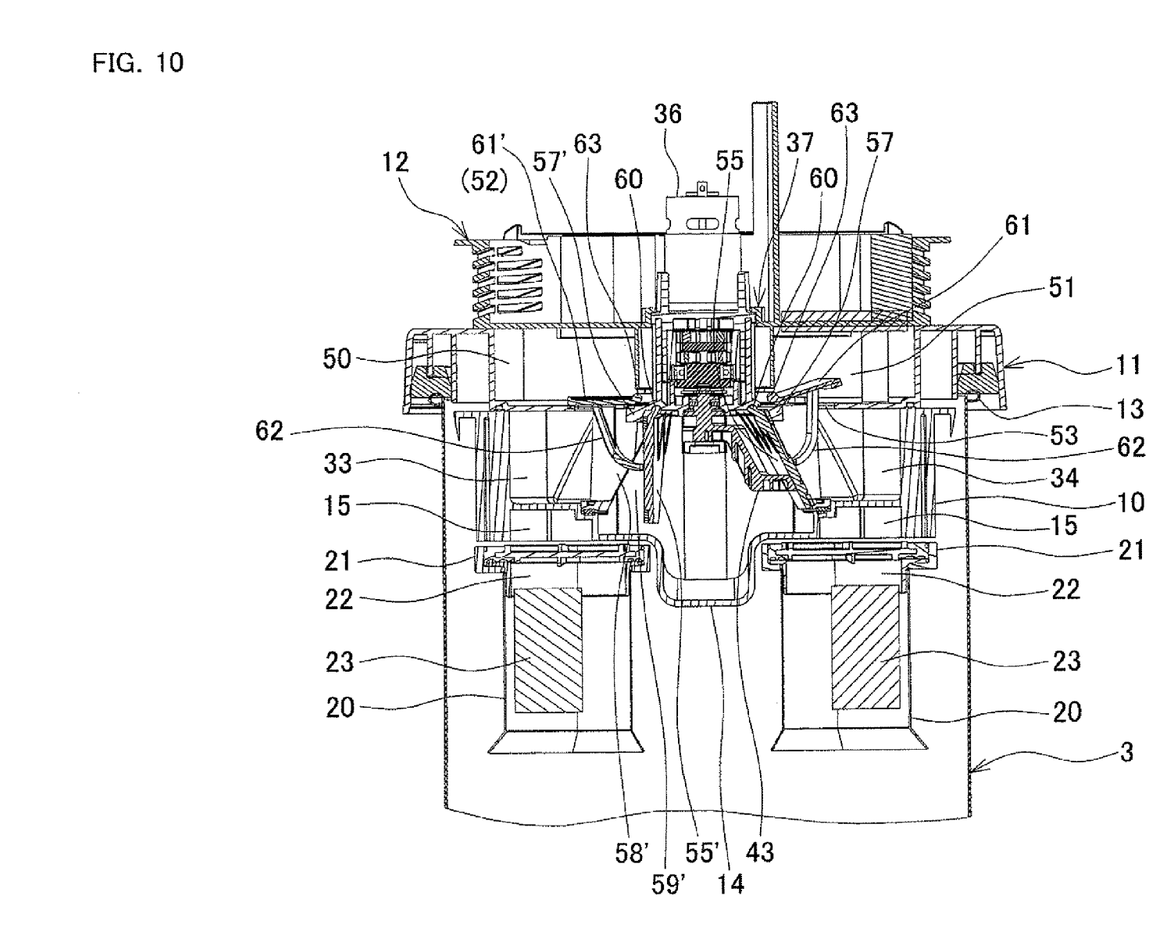
FIG. 10 is a diagram illustrating an operation of cleaning right filters and catching dust by left filters.

The dust caught by the prefilter 20 and the filters 23, 22 can cause clogging of the filters. In order to prevent this, in the present embodiment, the prefilter 20 and the filters 23, 22 can be cleaned by performing the operation described below during operation of the dust collector 1. During the dust collecting operation of catching dust by the prefilters 20, 20, the filters 23, 23, and the filters 22, 22 as shown in FIG. 9, the cam member 43 rotates rightward and contacts the first opening and closing member 55 of the intake passage 34 in response to rotation of the output shaft 42 of the DC motor 36, as shown in FIG. 10. Thus, the first opening and closing member 55 is pressed by the cam member 43 toward the tilted wall 57 of the intake passage 34, and contacts the tilted wall 57 so as to close the vent hole 58 and to eliminate the space for air flow, thereby performing the operation of closing the intake passage 34. In this manner, the first opening and closing member 55 closes one of the intake paths, which extends from the suction port 8 to the fan cover 30 through the intake passage 34. At this time, the arm portion 62 is pressed in a direction away from the tilted wall 57 by the first opening and closing member 55. Thus, the second opening and closing member 61 rotates in response to the operation of closing the intake passage 34 by the first opening and closing member 55. As a result, as shown in FIG. 10, the second opening and closing member 61 opens the inlet port 53 of the communication path 51.

In the state where the operation of closing the intake passage 34 is performed and the inlet port 53 is opened as shown in FIG. 10, the tank 3 and the main body case 11 has a negative pressure. Accordingly, the discharged air that has passed through the discharge passage 44 is guided from the inlet port 53 into the intake passage 34 as shown by two-dot chain arrow in FIG. 4. The discharged air in the intake passage 34 flows backward from the downstream side to the upstream side in the intake passage 34, and into the right filter 22 through the long hole 15. Then, the discharged air sequentially flows through the right filter 22, the right filter 23, and the right prefilter 20, and returns to the tank 3. At this time, the discharged air flowing backward can blow away the dust caught by the filters 20, 22, 23. Accordingly, in this dust collector 1, the right prefilter 20 and the right filters 23, 22 can be cleaned while catching dust by the left prefilter 20 and the left filters 23, 22. In addition, since the right and left prefilters 20, 20 have been subjected to an antistatic treatment, electrostatic attraction of dust to the prefilter 20 can be suppressed. As a result, a dust separation property is improved.

The discharged air that is returned to the tank 3 through the right filters 22, 23 and the right prefilter 20 flows into the intake passage 33 through the long hole 15 after flowing through the left prefilter 20 and the left filters 23, 23. Thus, the discharged air flows into the other intake path extending from the suction port 8 to the fan cover 30 via the intake passage 33.

On the other hand, if the cam member 43 rotates leftward and contacts the first opening and closing member 55' of the intake passage 33 during the dust collecting operation, the first opening and closing member 55' and the second opening and closing member 61' operate in a manner similar to that in the above example in which the cam member 43 rotates rightward. Thus, the discharged air that has passed through the discharge passage 44 is guided into the intake passage 33 through the inlet port 52 (see FIG. 4). At this time, the first opening and closing member 55 contacting the tilted wall 57 of the intake passage 34 is restored to the position where the vent hole 58 is opened as shown in FIG. 9. Thus, dust can be caught by the right prefilter 20 and the right filters 23, 22. The discharged air in the intake passage 33 flows backward from the downstream side to the upstream side in the intake passage 33. Thus, the discharged air sequentially flows through the left filters 22, 23 and the left prefilter 20, and returns to the tank 3. At this time, the discharged air flowing backward can blow away the dust caught by the filters 20, 22, 23. Accordingly, the left prefilter 20 and the left filters 23, 22 can be cleaned while catching dust by the right prefilter 20 and the right filters 23, 22. In the dust collector 1, the cam member 43 rotates alternately to the right and left, whereby the cam member 43 alternately contacts the first opening and closing member 55' capable of opening and closing the vent hole 58' of the intake passage 33 and the first opening and closing member 55 capable of opening and closing the vent hole 58 of the intake passage 34. Thus, the operation of closing the intake passage 33 and the operation of closing the intake passage 34 can be alternately performed. The DC motor 36 and the cam member 43 are an example of the operation unit of the present invention.

The dust collector 1 of the present embodiment uses the DC motor 36 and the cam member 43 to alternately perform the operation of closing the intake passage 33 and the operation of closing the intake passage 34 by the first opening and closing member 55' capable of opening and closing the vent hole 58' of the intake passage 33 and the first opening and closing member 55 capable of opening and closing the vent hole 58 of the intake passage 34. Thus, cleaning of the left filters 20, 23, 22 and cleaning of the right filters 20, 23, 22 can be alternately performed. This allows the left filters 20, 23, 22 and the right filters 20, 23, 22 to be cleaned during operation of the dust collector 1 as well. Moreover, since the DC motor 36 and the cam member 43 are used to operate the first opening and closing members 55, 55' and the second opening and closing members 61, 61', electric control is not required to operate the opening and closing members 55 (55'), 61 (61'), whereby the structure of the dust collector 1 is simplified.

Since the operation of closing the intake passage 33 and the operation of closing the intake passage 34 can be alternately performed by one DC motor 36 and one cam member 43 coupled to the output shaft 42 of the DC motor 36 via the speed reducer 41, the number of DC motors 36 and the number of cam members 43 can be minimized. This can suppress manufacturing cost of the dust collector 1.

The pair of filters 20, 20 can be arranged so as not to interfere with the DC motor 36 and the first opening and closing members 55, 55', and so as to suppress an increase in longitudinal dimension of the dust collector 1.

Moreover, since each prefilter 20 has been subjected to an antistatic treatment, accumulation of static electricity on the prefilter 20 can be suppressed. This suppresses electrostatic attraction of dust to the prefilter 20, whereby satisfactory dust separation from the prefilter 20 can be achieved.

Furthermore, in a normal state of the first opening and closing member 55', the vent hole 58' of the tilted wall 57' provided on the downstream side of the inlet port 52 in the intake passage 33 is opened. Similarly, in a normal state of the first opening and closing member 55, the vent hole 58 of the tilted wall 57 provided on the downstream side of the inlet port 53 in the intake passage 34 is opened. Accordingly, the intake passages 33, 34 can be opened in the normal state. On the other hand, if the first opening and closing members 55', 55 perform the operation of closing the intake passages 33, 34 respectively, the vent hole 58', 58 are closed and the spaces for air flow is eliminated, whereby each intake passage 33, 34 can be closed.

Figure 12:
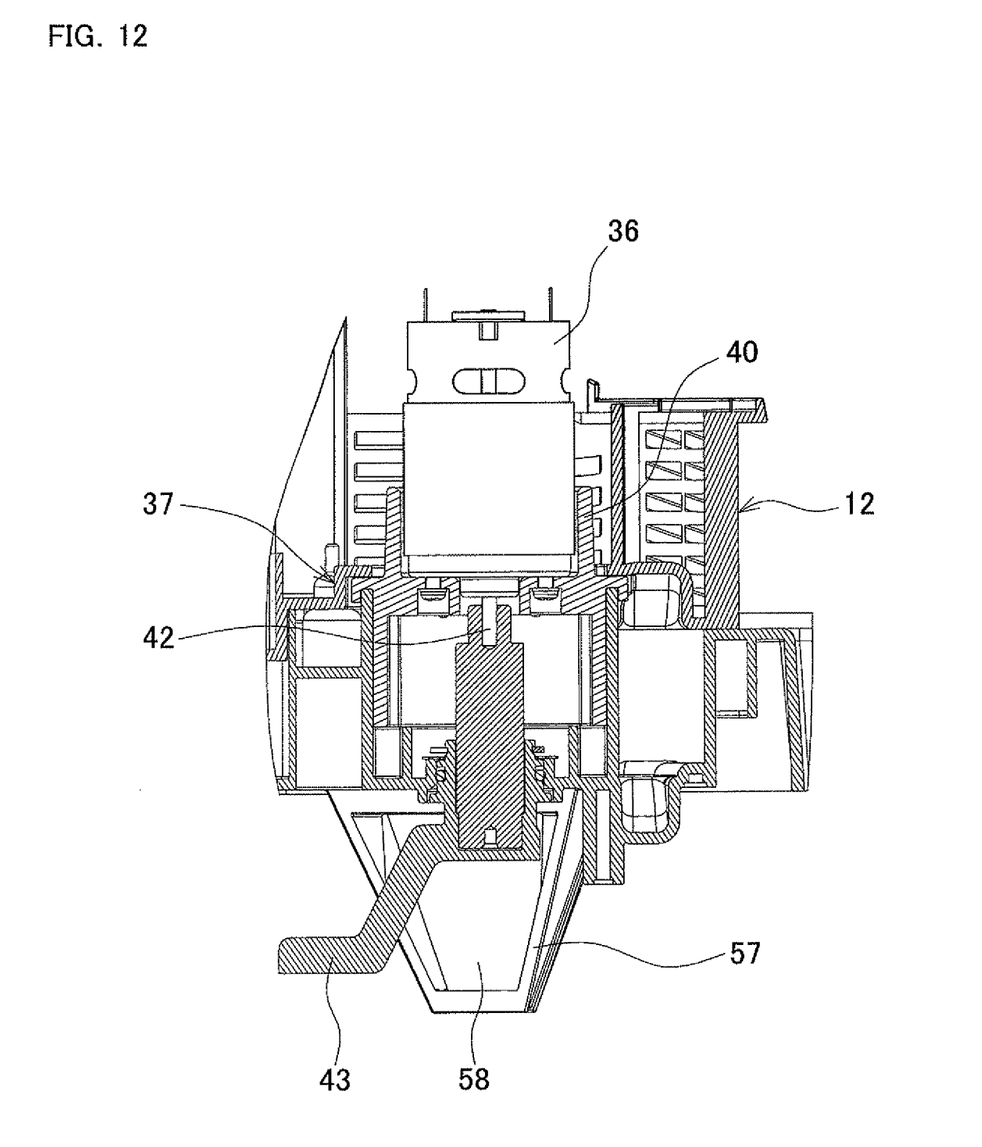
FIG. 12 is a partial sectional side view of a main body included in a dust collector according to another embodiment.

The present invention is not limited to the above embodiment, and the configuration can be partially modified as appropriate without departing from the scope of the invention. For example, in the case where the DC motor and the cam member which operate the first opening and closing member 55 of the intake passage 33 are provided separately from the DC motor and the cam member which operate the first opening and closing member 55 of the intake passage 34, and the operation of closing the intake passage 33 is performed by one of the DC motors and one of the cam members, the first opening and closing member 55 of the intake passage 34 may be biased by the other DC motor and the other cam member to the position where the vent hole 58 is closed. In addition to the prefilter 20, the paper filter 22 may be subjected to an antistatic treatment. Unlike the above embodiment, the second opening and closing member may be provided so as to be connected to the first opening and closing member, and the second opening and closing member may open the inlet port of the communication path in response to the operation of closing the first opening and closing member. Unlike the above embodiment, the cam member 43 shown in FIG. 12 may be directly coupled to the output shaft 42 of the DC motor 36 having high toque characteristics. In this case, for example, by rotating the output shaft 42 of the DC motor 36, the cam member 43 is rotated leftward to bring the first opening and closing member 55 into contact with the tilted wall 57 of the intake passage, and then current application to the DC motor 36 is stopped. In this case, the first opening and closing member 55 can press the cam member 43 back in the direction away from the tilted wall 57 due to the pressure of the discharged air in the intake passage. Accordingly, unlike the above embodiment, the cam member 43 rotated leftward need not be controlled to rotate rightward by the DC motor 36 in order to open the vent hole 58 of the intake passage.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A dust collector, comprising:
   a tank having a suction port in an upper part thereof;
   a main body including an electric blower, air drawn through the suction port from outside by the electric blower is configured to be discharged through the tank and the main body,
   a pair of the intake paths in which air flows respectively through a pair of filters projecting within the tank, and formed so as to be combined together on an upstream side of the electric blower, each of the pair of the intake paths extending from the suction port separately, the pair of the intake paths forming separate two paths from the suction port to the electric blower;

a pair of communication paths, each of the pair of communication paths being connected to the corresponding intake path and being communicated to a discharge passage disposed on a downstream side of the electric blower;

first opening and closing members each provided on a downstream side of the communication path in the intake path, capable of opening and closing the intake path, and formed so as to be biased, in a normal state, to a position where the first opening and closing member opens the intake path;

second opening and closing members each provided in the communication path, capable of opening and closing the communication path, formed so as to be biased, in the normal state, to a position where the second opening and closing member closes the communication path, and to open the communication path in response to a closing operation of closing the intake path by the first opening and closing member; and an operation unit capable of alternately causing the first opening and closing members in the intake paths to perform the closing operation, wherein when the operation unit causes one of the first opening and closing members to perform the closing operation and thus causes the second opening and closing member to open the communication path, discharged air in the discharge passage is guided to one of the intake paths via the communication path, the discharged air is caused to flow backward in the intake path and returned to the tank through the filter, and is guided to the other intake path, so that the dust on the filter of the one intake path is removed.

2. The dust collector according to claim 1, wherein the operation unit includes a motor placed between the pair of first opening and closing members, and a cam member provided on an output shaft of the motor and formed to alternately contact the first opening and closing members respectively in response to rotation of the output shaft so that the first opening and closing member performs the closing operation.

3. The dust collector according to claim 2, wherein the filters through which air flows in the pair of intake paths are placed outside the motor so as to face each other with an interval therebetween, and each of the first opening and closing members is placed between each of the filters and the motor.

4. The dust collector according to claim 1, wherein the filter includes a primary filter capable of catching the dust and having been subjected to an antistatic treatment.

5. The dust collector according to claim 1, wherein a tilted portion having a vent hole is provided on the downstream side of the communication path in the intake path so as to face the first opening and closing member in the normal state with a space for air flow therebetween, and the first opening and closing member performing the closing operation is capable of contacting the tilted portion in a state where the vent hole is closed and the space for air flow is eliminated.

6. The dust collector according to claim 5, wherein the first opening and closing member is supported by a support shaft near the tilted portion in the intake path so as to be rotatable in a direction toward and away from the tilted portion via the support shaft, and when the cam member contacts the first opening and closing member, the first opening and closing member rotates in the direction toward the tilted portion, and thus performs the closing operation and contacts the tilted portion.

7. The dust collector according to claim 6, wherein an inlet port that allows the discharge passage to communicate with the intake path is formed in the communication path, and in the normal state, the second opening and closing member is biased to a position where the second opening and closing member closes the inlet port, the second opening and closing member includes a bar-shaped arm portion having a distal end thereof facing the first opening and closing member, and a support shaft for supporting the second opening and closing member in the communication path so that the second opening and closing member is rotatable in a direction toward and away from the inlet port, and the first opening and closing member that rotates in a direction toward the tilted portion presses the second opening and closing member through the arm portion, whereby the second opening and closing member rotates in the direction away from the inlet port to open the inlet port.

8. The dust collector according to claim 4, wherein the primary filter is formed as a cylindrical body, a tertiary filter as a cylindrical body is mounted inside the primary filter so that a filter surface of the tertiary filter faces an inner surface of the primary filter, and a secondary filter is mounted on the filter surface of the tertiary filter.

9. The dust collector according to claim 8, wherein the primary filter is made of woven fabric, the secondary filter is made of polyurethane sponge, and the tertiary filter is made of paper.

10. The dust collector according to claim 8, wherein the main body has a filter fixing member, a latch member capable of swinging via a support shaft is attached to a side surface of the filter fixing member, and an engagement member with which the latch member is engaged is attached to a peripheral edge of an upper part of the primary filter.

11. The dust collector according to claim 1, further comprising:

a traveling base having a recess in an upper surface thereof and having a wheel rotatably provided on a bottom surface thereof, wherein the tank is placed on the traveling base so as to be fitted in the recess.

12. The dust collector according to claim 1, wherein a hook is attached to an outer side surface of the tank, and a hook engagement portion that engages with the hook is provided in the main body.

13. A dust collector, comprising:

a tank;

a main body connected to the tank and having an electric blower;

a primary filter and a secondary filter which are held by the main body;

a first opening and closing member connected to the primary filter;

a second opening and closing member connected to the secondary filter;

a cam member configured to move the first opening and closing member and the second opening and closing member, and a motor configured to move the cam member, wherein air flows forward from the primary filter to the secondary filter so that dust is collected in the tank, air flows backward to the primary filter when the cam is positioned at a first position, and air flows backward to the secondary filter when the cam member is positioned at a second position.

* * * * *